March 13, 1934. W. J. BLANCHARD 1,951,320
VARIABLE PITCH PROPELLER
Filed Sept. 16, 1930
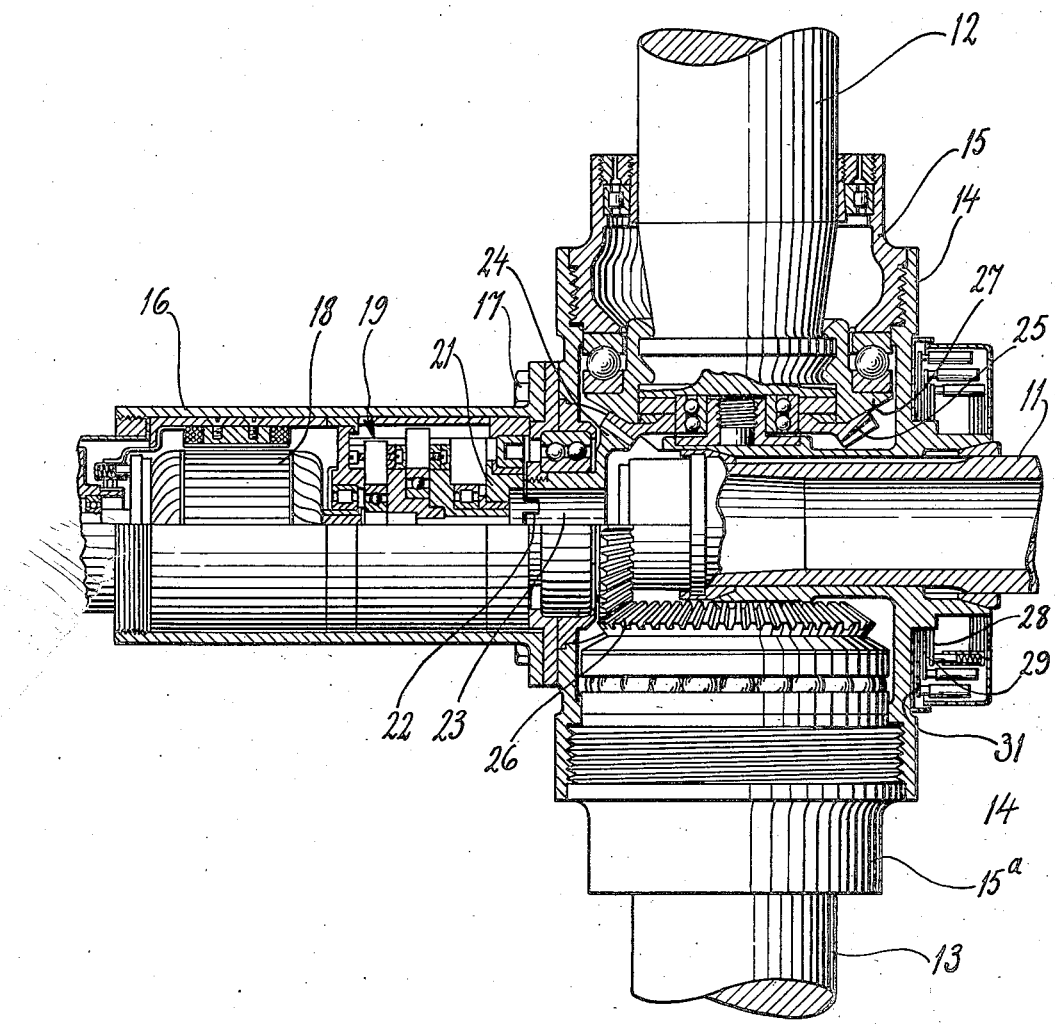
INVENTOR
WERNER J. BLANCHARD
BY
ATTORNEY Patented Mar. 13, 1934

1,951,320

UNITED STATES PATENT OFFICE 1,951,320

VARIABLE PITCH PROPELLER

Werner J. Blanchard, Hempstead, N. Y., assignor to Curtiss Aeroplane & Motor Company, Inc., a corporation of New York Application September 16, 1930, Serial No. 482,249

10 Claims. (Cl. 170—163)

My invention relates to variable pitch vane propellers and has a particularly valuable application to aeronautical propellers of the variable or adjustable pitch type.

I am aware that numerous variable pitch aeronautical propellers have been proposed and a number actually built for practical demonstration. In every instance, however, insofar as I am aware, such developments have, for one reason or another, been either wholly abandoned or failed because of unsatisfactory performance, due principally to overweight, complexity, unreliability, bulkiness or excessive cost. I am further aware that it has heretofore been proposed, by means of an electric motor, and suitable gearing, to vary the pitch angle setting of the blades. This latter type variable pitch propeller, without question, seems to have more nearly supplied the need (which undoubtedly exists) for a light weight, reliable, compact, not too expensive, and not too complicated variable pitch propeller than any other type. The present invention deals, therefore, with improvements in this particular field of variable pitch propeller development. The invention has applicability otherwise than in the art of aeronautics.

One of the principal requirements of a variable pitch aeronautical propeller, in which the blades are adapted for pitch angle adjustment by means of an electric motor, is that the driving connection between the armature or motor shaft and the propeller blades be so organized and constructed as to admit of a proper speed reduction (anywhere from 10,000 to 50,000 to 1) without the intervention of a multiplicity of shafts and gears and without an arrangement whereby the driving connection is extended thru a multiplicity of angles. By my use of a so-called helio-centric speed reducer the desired speed reduction is achieved. Such use lends itself to the substitution of lighter materials (impossible where shafts and gearing are employed) and by reason of its inherent characteristics is more compact, is self-contained, offers less resistance, and works equally well in either or both directions of rotation.

In addition to the use of a helio-centric speed reducer, the present invention contemplates an arrangement in which the inner ends of the propeller blades are arranged for rotation within the propeller hub structure, in which suitable gearing is likewise wholly enclosed within said hub structure, and in which the electric motor and the helio-centric gear reducer constitute a unit assembly fastened to and removable from the hub structure, as a unit, the unit assembly having a driving connection with said gearing whereby the propeller hub may be rotated by and as a result of the operation of the electric motor.

One of the objects of this invention is to provide a simple, reliable, light-weight and compact mechanism for varying the pitch of the blades of a variable pitch propeller.

A further object of the invention is to provide means for varying the pitch of the blades of a variable pitch propeller so designed that the pitch adjusting mechanism may be removed as a unit from the hub of the propeller.

A further object of the invention is to provide an electric motor and a speed reducing mechanism constructed together as a unit for varying the pitch of a variable pitch propeller and positioned with the axis of rotation of the motor in substantial alignment with the axis of rotation of the propeller and with the axis of rotation of the intermediate speed reducing mechanism.

Further objects will be apparent from a reading of the subjoined specification and claims and from a consideration of the accompanying drawing.

In order to explain the invention more clearly, one embodiment thereof is shown in said drawing, in which:

The figure is a plan view of a variable pitch propeller constructed in accordance with my invention shown in half section and with parts broken away.

Referring particularly to the figure I have shown a propeller drive shaft 11 positioned intermediate the propeller blades 12 and 13. Surrounding the shaft 11 and secured thereto, is the propeller hub 14. Screwed into opposite ends of the hub 14 are the bearing sleeve 15 for the blade 12 and the bearing sleeve 15ª for the blade 13. The hub 14 has formed on the forward side thereof, opposite to the drive shaft 11 an opening for the reception of the motor and speed reducing mechanism unit.

The electric motor and speed reducing mechanism are positioned in front of the hub 14 and arranged with their axes in alignment with the axis of the shaft 11. They are substantially enclosed by the casing 16 which is secured to the hub by means of bolts such as that indicated at 17. The casing 16 is formed with an opening corresponding to the opening in the hub 14. The electric motor 18 is arranged to drive the speed reducing mechanism 19 which is of the helio-centric type. The mechanism 19 comprises three helio-centric reducers, the out-put or low speed shafts of the first and second serving respectively as the in-put or high speed shaft of the second and third. Each of the three consists of an eccentric on the high speed shaft driving a series of plungers assembled radially in a spool piece mounted on the low speed shaft. These plungers engage a stationary internal gear rack and progressively move forward on the rack carrying the low speed shaft around with them. The number of teeth in the rack determine the speed reduction.

The last out-put shaft 21 from the speed reducer 19 is provided with several rectangular lugs such as 22 which are adapted to engage with notches in the bevel gear sleeve 23 and thus the sleeve 23 is driven from the speed reducer. The sleeve 23 carries a bevel gear 24 which meshes with the bevel gears 25 and 26, all of said gears being enclosed within the hub 14. The bevel gear 25 is splined to a locking wedge or sleeve 27 which is in turn secured to the butt of the blade 12. Similarly the bevel gear 26 is connected to the blade 13. By means of the wedges 27 and the bearing sleeves 15 and 15ª, the blades 12 and 13 are securely anchored within the hub 14.

Contact rings 28 and 29 are provided for the purpose of coacting with the ground of the propeller and engine for conveying electrical current from the stationary part of the aeroplane to the electric motor 18 in order that the motor may be driven either in a forward or reverse direction. A contact ring 31 is also provided for an electric pitch angle indicator. It is to be particularly noted that the drive shaft of the electric motor 18 is in direct line with both the in-put shaft and the out-put shaft of the speed reducer 19 and with the axis of the propeller drive shaft 11. It is also to be particularly noted that by the removal of the bolts 17, the casing 16 and the motor-reducer unit may be removed, the lugs 22 being thereby withdrawn from their associated notches.

It is thought that the operation of the device illustrated will be apparent from the above description. The propeller blades 12 and 13 are driven from the engine thru the drive shaft 11 and while being driven may be rotated about their longitudinal axes in order to vary the pitch of the propeller. Electric current may be caused to flow thru either one of two electric circuits, utilizing one of the contact rings 28 or 29 for transfer from the stationary to the moving parts of the apparatus. Thus the current may be caused to flow in either direction thru the electric motor 18. The flow causes the shaft of the electric motor 18 to revolve either in a forward or reverse direction and thus causes the in-put shaft of the speed reducer 19 to revolve in a corresponding direction. The out-put shaft of the speed reducer 19 is thus caused to revolve at a very much slower speed (e. g. 1 to 27,000) and the bevel gear 24 meshing with the bevel gears 25 and 26 rotates those gears to change the pitch angle of the blades 12 and 13.

It is to be understood that the above described embodiment of my invention is for the purpose of illustration only, and various changes may be made therein without departing from the spirit or scope of the invention.

What I claim is:

1. A variable pitch propeller including a central hub structure within which the inner ends of the propeller blades are anchored for rotation, and within which gearing for rotating said blades is enclosed; and a unit assembly carried by and detachably fastened to said hub structure for removal therefrom as a unit, said assembly including an electric motor and speed reducing mechanism driven thereby, said mechanism having a driving connection with said gearing whereby the propeller blades may be rotated by and as a result of the operation of said electric motor.

2. A variable pitch propeller including a central hub structure within which the inner ends of the propeller blades are anchored for rotation, and within which gearing for rotating said blades is enclosed, said hub structure having formed therein an opening; and a unit assembly carried by and detachably fastened to said hub structure for removal therefrom as a unit, said assembly including an electric motor and speed reducing mechanism driven thereby, said mechanism having a driving connection by way of said opening with said gearing whereby the propeller blades may be rotated by and as a result of the operation of said electric motor.

3. A variable pitch propeller including a central hub structure within which the inner ends of the propeller blades are anchored for rotation, and within which gearing for rotating said blades is completely enclosed, said hub structure having formed in its forward face an opening; an electric motor including a power shaft in axial alignment with the axis of rotation of the propeller; speed reducing mechanism driven by said power shaft and having a driving connection with said gearing whereby the propeller blades may be rotated by and as a result of the operation of the electric motor; and a casing within which both the electric motor and said speed reducing mechanism are completely enclosed, said casing being open at one end and being fastened at its open end to said hub structure directly over said opening in said hub structure.

4. In a variable pitch propeller, in combination; a central hub structure within which the inner blade ends are anchored for rotation; a bevel gear at the inner end of each blade and completely enclosed within said hub structure, said hub structure having formed therein an opening, an electric motor carried by and rotatable with said propeller, said motor including a drive shaft having an axis of rotation in substantial alignment with the axis of rotation of the propeller; a heliocentric speed reducer having an input shaft in axial alignment with and coupled to said motor drive shaft and an output shaft in axial alignment with said input shaft and terminating at its outer end adjacent to said opening, a bevel gear driven by said output shaft and in mesh with the bevel gears first mentioned, said last mentioned bevel gear being enclosed within said hub structure; and a casing within which both the electric motor and the gear reducer are enclosed, said casing being detachably fastened to said hub structure directly over said opening for removal along with said motor and said speed reducer as a unit.

5. In a variable pitch propeller, in combination, a central hub structure, propeller blades anchored for rotation in said hub structure, gearing carried by the inner ends of said blades, an axially elongated casing secured to said hub structure and having its major axis aligned with the axis of rotation of said propeller, and a power unit completely enclosed within said casing, said unit comprising an electric motor and a speed reducer having a driving connection with said gearing.

6. In a variable pitch propeller, in combination, a central hub structure, propeller blades anchored for rotation in said hub structure, gearing for rotating said blades enclosed within said hub structure, an axially elongated casing detachably secured to said hub structure and having its major axis aligned with the axis of rotation of said propeller, and a power unit completely enclosed within said casing, said unit having a driving connection with said gearing adapted to be established and disrupted upon the attachment and detachment of said casing to and from the hub structure.

7. The combination of a rotating hub, a power shaft extending from one side thereof for power application thereto, vanes of the character described carried by and extending substantially radially from the hub and being mounted to turn on their long axes respectively relative to the hub, and means for turning the vanes on their long axes respectively while the hub is rotating, said means including a driving shaft on the axis of said power shaft, a speed-reducing mechanism in unitary form mounted in fixed relation to said hub to rotate with it and being driven by said driving shaft and having a relatively slow-speed output element mounted to rotate on the axis of said shafts, said mechanism being mounted beyond the end of said power shaft and at the side of the hub opposite the side thereof from which said power shaft extends, and means connecting the inner end portions of the vanes respectively and said slow speed output element for transmitting rotative power from said output element to the vanes respectively for turning them on their axes relative to the hub and at a slow rate of speed, and a hollow housing member projecting from said hub-like member and carried thereby and said motor and said speed reducing mechanism are in said housing.

8. The combination of a rotating hub, a power shaft extending from one side thereof for power application thereto, vanes of the character described carried by and extending substantially radially from the hub and being mounted to turn on their long axes respectively relative to the hub, and means for turning the vanes on their long axes respectively while the hub is rotating, said means including a driving shaft on the axis of said power shaft, a speed-reducing mechanism in unitary form mounted in fixed relation to said hub to rotate with it and being driven by said driving shaft and having a relatively slow-speed output element mounted to rotate on the axis of said shafts, said mechanism being mounted beyond the end of said power shaft and at the side of the hub opposite the side thereof from which said power shaft extends, and means connecting the inner end portions of the vanes respectively and said slow-speed output element for transmitting rotative power from said output element to the vanes respectively for turning them on their axes relative to the hub and at a slow rate of speed.

9. Means for varying the pitch of vanes of the character described mounted to turn on their long axes respectively in a rotatable hub having a forwardly-projecting nose, with a power shaft for rotating the hub, comprising an electric motor rigidly mounted in the nose of the hub and turning as a whole therewith and having its axis disposed in substantially the same direction as the axis of the power shaft and having a shaft on the axis of the power shaft, a speed-reducing mechanism also mounted in the nose of the hub to turn as a whole therewith, said motor shaft being in driving relation to said mechanism, said mechanism having a circularly-toothed slow-speed output element on the axis of said shafts, each vane extending into the hub and having a toothed element meshing with said slow-speed output element and being turned slowly thereby when the device is normally in use.

10. The combination of a rotating hub, a power shaft extending from one side thereof for power application thereto, vanes of the character described carried by and extending substantially radially from the hub and being mounted to turn on their long axes respectively relative to the hub, and means for turning the vanes on their long axes respectively while the hub is rotating, said means including a driving shaft on the axis of said power shaft, a speed-reducing mechanism in unitary form mounted in fixed relation to said hub to rotate with it and being driven by said driving shaft and having a relatively slow-speed output element mounted to rotate on the axis of said shafts, said mechanism being mounted beyond the end of said power shaft and at the side of the hub opposite the side thereof from which said power shaft extends, and means connecting the inner end portions of the vanes respectively and said slow-speed output element for transmitting rotative power from said output element to the vanes respectively for turning them on their axes relative to the hub and at a slow rate of speed, said motor and said speed-reducing mechanism being in substantially close end to end arrangement.

WERNER J. BLANCHARD.